(12) United States Patent
Wood

(10) Patent No.: US 7,536,535 B2
(45) Date of Patent: May 19, 2009

(54) SELF-TIMED PROCESSOR

(75) Inventor: Paul B. Wood, Austin, TX (US)

(73) Assignee: Altrix Logic, Inc., Austin, TX (US)

( * ) Notice: Subject to any disclaimer, the term of this patent is extended or adjusted under 35 U.S.C. 154(b) by 0 days.

(21) Appl. No.: 11/379,681

(22) Filed: Apr. 21, 2006

(65) Prior Publication Data
US 2006/0242386 A1 Oct. 26, 2006

Related U.S. Application Data

(60) Provisional application No. 60/673,994, filed on Apr. 22, 2005, provisional application No. 60/674,070, filed on Apr. 22, 2005, provisional application No. 60/673,995, filed on Apr. 22, 2005.

(51) Int. Cl.
G06F 7/38 (2006.01)
G06F 9/00 (2006.01)
G06F 9/44 (2006.01)
G06F 15/00 (2006.01)

(52) U.S. Cl. ...................................... 712/220
(58) Field of Classification Search ................. 712/220
See application file for complete search history.

(56) References Cited

U.S. PATENT DOCUMENTS 3,656,123 A * 4/1972 Carnevale et al. ........... 713/600
4,172,281 A * 10/1979 Gordon ....................... 712/221
4,851,995 A * 7/1989 Hsu et al. .................... 713/500
5,293,626 A * 3/1994 Priest et al. .................. 713/401
5,428,754 A * 6/1995 Baldwin ...................... 712/220
5,455,931 A * 10/1995 Camporese et al. .......... 713/501
5,553,276 A * 9/1996 Dean ........................... 713/500
5,634,041 A * 5/1997 Pratt et al. ................... 713/375
5,673,391 A * 9/1997 Webb et al. ................... 714/20
5,729,766 A * 3/1998 Cohen ......................... 710/58
6,178,494 B1 * 1/2001 Casselman .................... 712/37

* cited by examiner

Primary Examiner—Eddie P Chan
Assistant Examiner—Corey S Faherty
(74) Attorney, Agent, or Firm—Law Offices of Mark L. Berrier

(57) ABSTRACT

Systems and methods for executing program instructions in a data processor at a variable rate. In one embodiment, a processor is configured to examine received instructions, identify an execution time associated with each instruction, and generate clock pulses at necessary intervals to obtain the appropriate execution time for each instruction. Instructions may be associated with types or "bins" that are in turn associated with corresponding execution times. The clock pulses may be generated by routing successive pulses through circuits that delay the pulses by desired amounts of time. The processor may also be configured to identify instructions which are input/output (I/O) instructions and are initiated or terminated by completion of handshake procedures and therefore have execution times that vary from one instance to the next.

20 Claims, 3 Drawing Sheets

SELF-TIMED PROCESSOR

CROSS-REFERENCE TO RELATED APPLICATIONS

This application claims the benefit of U.S. Provisional Patent Application 60/673.994, filed Apr. 22, 2005, U.S. Provisional Patent Application 60/674,070, filed Apr. 22, 2005, and U.S. Provisional Patent Application 60/673,995, filed Apr. 22, 2005. All of the foregoing patent applications are incorporated by reference as if set forth herein in their entirety.

BACKGROUND

1. Field of the invention

The invention relates generally to electronic logic circuits, and more particularly to systems and methods for processing data using a processor that executes program instructions at a variable frequency.

2. Related art

As computer technologies have advanced, the amount of processing power and the speed of computer systems has increased. The speed with which software programs can be executed by these systems has therefore also increased. Despite these increases, however, there has been a continuing desire to make software programs execute faster.

The need for speed is sometimes addressed by hardware acceleration. Conventional processors re-use the same hardware for each instruction of a sequential program. Frequently, programs contain critical code in which the same or similar sections of software are executed many times relative to most other sections in an application. To accelerate a program, additional hardware is added to provide hardware parallelism for the critical code fragments of the program. This gives the effect of simultaneous execution of all of the instructions in the critical code fragment, depending on the availability of data. In addition, it may be possible to unroll iterative loops so that separate iterations are performed at the same time, further accelerating the software.

While there is a speed advantage to be gained, it is not free. Hardware must be designed specifically for the software application in question. The implementation of a function in hardware generally takes a great deal more effort and resources than implementing it in software. Initially, the hardware architecture to implement the algorithm must be chosen based on criteria such as the operations performed and their complexity, the input and output data format and throughput, storage requirements, power requirements, cost or area restrictions, and other assorted criteria.

A simulation environment is then set up to provide verification of the implementation based on simulations of the hardware and comparisons with the software. A hardware target library is chosen based on the overall system requirements. The ultimate target may be an application specific integrated circuit (ASIC), a field programmable gate array (FPGA), or other similar hardware platform. The hardware design then commences using a hardware description language (HDL), the target library, and the simulation environment. Logic synthesis is performed on the HDL design to generate a netlist that represents the hardware based on the target library.

While there are number of complex and expensive design tools employed throughout the process, frequent iterations are typically needed in order to manage tradeoffs, such as between timing, area, power and functionality. The difficulty of the hardware design process is a function of the design objectives and the target library. The continued advances in semiconductor technology continue to raise the significance of device parameters with each new process generation. That, coupled with the greater design densities that are made possible, ensures that the hardware design process will continue to grow in complexity over time.

This invention pertains to the implementation of algorithms in hardware—hardware that performs logic or arithmetic operations on data. Currently available methodologies range from using single processors, arrays of processors, either fixed (gate array) or field-programmable gate arrays (FPGA), or standard cell (ASIC) or full custom design techniques. Some designs may combine elements of more than one methodology. For example, a processor may incorporate a block of field programmable logic.

When comparing different implementations of programmable logic, the notion of granularity is sometimes used. It relates to the smallest programmable design unit for a given methodology. The granularity may range from transistors, through gates and more complex blocks, to entire processors. Another consideration in comparing programmable hardware architectures is the interconnect arrangement of the programmable elements. They may range from simple bit-oriented point-to-point arrangements, to more complex shared buses of various topologies, crossbars, and even more exotic schemes.

Full custom or standard cell designs with gate-level granularity and dense interconnects offer excellent performance, area, and power tradeoff capability. Libraries used are generally gate and register level. Design times can be significant due to the design flow imposed by the diversity of complex tools required. Verification after layout for functionality and timing are frequently large components of the design schedule. In addition to expensive design tools, manufacturing tooling costs are very high and climbing with each new process generation, making this approach only economical for either very high margin or very high volume designs. Algorithms implemented using full custom or standard cell techniques are fixed (to the extent anticipated during the initial design) and may not be altered.

The design methodology for fixed or conventional gate arrays is similar to that of standard cells. The primary advantages of conventional gate arrays are time-to-market and lower unit cost, since individual designs are based on a common platform or base wafer. Flexibility and circuit density may be reduced compared to that of a custom or standard cell design since only uncommitted gates and routing channels are utilized. Like those built with custom or standard cell techniques, algorithms implemented using conventional gate arrays are fixed and may not be altered after fabrication.

FPGAs, like conventional gate arrays, are based on a standard design, but are programmable. In this case, the standard design is a completed chip or device rather than subsystem modules and blocks of uncommitted gates. The programmability increases the area of the device considerably, resulting in an expensive solution for some applications. In addition, the programmable interconnect can limit the throughput and performance due to the added impedance and associated propagation delays. FPGAs have complex macro blocks as design elements rather than simple gates and registers. Due to inefficiencies in the programmable logic blocks, the interconnect network, and associated buffers, power consumption can be a problem. Algorithms implemented using FPGAs may be altered and are therefore considered programmable. Due to the interconnect fabric, they may only be configured when inactive (without the clock running). The time needed to reprogram all of the necessary interconnects and logic blocks can be significant relative to the speed of the device, making real-time dynamic programming unfeasible.

Along the continuum of hardware solutions for implementing algorithms lie various degrees of difficulty or specialization. This continuum is like an inverted pyramid, in that the lowest levels require the highest degree of specialization and hence represent a very small base of potential designers, while the higher levels utilize more generally known skills and the pool of potential designers grows significantly (see Table 1.) Also, it should be noted that lower levels of this ordering represent lower levels of design abstraction, with levels of complexity rising in higher levels.

TABLE 1

Designer bases of different technologies

Processor / Programmers
FPGA / System designers
ASIC / Hardware designers
Custom / Circuit designers There is therefore a need for a technology to provide software acceleration that offers the speed and flexibility of an ASIC, with the ease of use and accessibility of a processor, thus enabling a large design and application base.

SUMMARY OF THE INVENTION

This disclosure is directed to systems and methods for executing program instructions in a data processor at a variable rate. In one embodiment, a processor is configured to examine received instructions and to identify an execution time associated with each instruction. For example, instructions may be associated with one of three types that are require short, medium, or long times to execute. The types may be named "fast," "medium" and "slow," respectively. The processor generates clock pulses that are routed through fast, medium or slow delay circuits to achieve the appropriate execution time for the corresponding instruction. The processor is also configured to identify instructions that are input/output (I/O) instructions and have execution times that are dependent upon completion of handshake procedures instead of predetermined delays.

An alternative embodiment comprises a method implemented in a data processor. The method includes receiving a program instruction and executing the instruction in an amount of time which is variable and which is dependent upon a type of the instruction. In one embodiment, the execution time for certain types of instructions is predetermined, but varies with the different types of instructions. The execution time for other types of instructions may be based on completion of a handshake procedure. Timing the execution of instructions may involve generating pulses of a variable-frequency clock signal. The delay between pulses may be determined by passing pulses through selectable delay circuits that have different delays.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
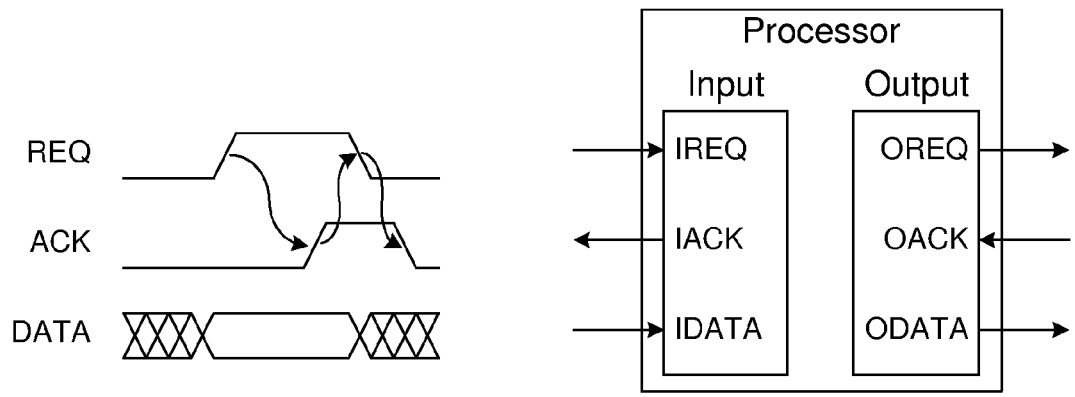
FIG. 1 is a diagram illustrating simple request/acknowledge handshake protocol scheme, as well as the transmission and reception of the handshake signals by input/output ports of a processor in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment that is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for executing program instructions in a data processor at a variable rate. In one embodiment, a processor is configured to examine received instructions and to identify an execution time associated with each instruction. For example, instructions may be associated with one of three types that are require short, medium, or long times to execute. The types may be named "fast," "medium" and "slow," respectively. The processor generates clock pulses that are routed through fast, medium or slow delay circuits to achieve the appropriate execution time for the corresponding instruction. The processor is also configured to identify instructions which are input/output (I/O) instructions and have execution times that are dependent upon completion of handshake procedures instead of predetermined delays.

In a conventional synchronous design, the clock period consists of the maximum or worst-case timing through the longest logic path, plus top-level clock skew and uncertainty, all over the worst-case operating conditions relative to process, voltage and temperature variations. This invention allows the processor to run at "best-case" speeds for a given instruction at current operating conditions. There is no global clock—instead, each instruction is examined to determine the appropriate clock period for that instruction based only on the timing paths that produce the needed results. All other timing paths are ignored.

Pipelining is a common method that is used to improve processor performance. Registers are placed at various stages in the logic paths. The performance is improved compared to a non-pipelined design because the clock period can be shortened. Without pipelining, the clock period must be greater than the total path delay, plus uncertainty and margin. With pipelining, only the path delays between each set or stage of registers is considered. The clock period can then be reduced to that of the worst stage, plus uncertainty and margin.

The timing variation of different paths through a module for different operations can be dramatic. If the clock period were not a fixed quantity, and could vary based on the actual path of interest for the operation of interest, performance could be improved, possibly as an alternative to pipelining. For example, consider the following hypothetical instruction examples:
 a) move data from one register to another
 b) increment the value in a register
 c) multiply two registers and store the result The path delay required for a) is relatively short—from the source register through any routing multiplexers, to the destination register. The path delay for b) would be somewhat longer, though relatively short. The source register would be routed through an ALU that would perform the increment function, with the result being routed to the destination register (which in this case is the same as the source). The path delay for the third example, c) is significantly longer. While similar to b), instead of an adder, the sources must go through the logic paths of a parallel multiplier. Not only are the logic paths of various instructions quite different, the incidence of their use within programs varies widely as well. In is quite common to have more shorter, simpler operations or instructions than the longer, more complex operations in common blocks of code.

One of the principle concepts of processors is the reuse of hardware over time. As an alternative to connecting together the hardware elements needed to implement a function, software is written, rendering the function into an algorithm. The sequence of events needed to implement the algorithm is translated into instructions that are then executed over time on a single piece of hardware, the processor. Time is marked by a clock signal with a specific frequency or clock period. The instruction stream dictates the sequence of operations, including loops and branches that must be performed. Hardware costs are reduced and flexibility is attained at the expense of performance. As semiconductor process technology continues to advance, hardware speeds also continue to increase. Device densities increase, as do the costs and complexities of the actual hardware design. Therefore, the increasing trend of moving hardware designs to software becomes more attractive for a larger set of applications.

In early processor systems, memory was expensive and slow compared to that available today. One method used to improve performance was to tune the instruction set to accomplish more with fewer instructions, thus using fewer, more complex instructions. This reduced the number of accesses to slower external memory, thereby improving performance. These "complex instruction set computers", or CISC processors then used internal microcode subroutines to break those complex instructions into the native microinstructions. The use of complex instructions layered on top of microcode led to some instructions taking multiple clock cycles to execute. At the system level, they were more efficient since they used fewer instructions, which meant fewer accesses to slower, expensive external memory.

Today, due to advances in semiconductor process technology, memory is much cheaper and faster, with large amounts of it available on the same die as the processor. The internal logic of the processor is faster as well. One strategy to improve performance has been to utilize on-chip memory as a cache and simplify the instruction set. These processors are known as "reduced instruction set computers" or RISC processors. By eliminating microcode subroutines, the entire instruction flow may then be pipelined. This results in many cascaded stages of much smaller operations, resulting in a higher overall clock frequency. The throughput (of straight-line instruction sequences) is thus greatly accelerated. Multiple parallel execution units are also sometimes employed. Situations such as program branches or conditional jumps can complicate pipelined systems, however. Therefore, in addition to heavy pipelining, contemporary high-end processors often employ speculative execution, register renaming, and other very complex performance techniques to help offset the effects of non-sequential instruction execution or dependencies in sequential instructions that are executed in parallel. These steps are necessary to keep the very long pipelines filled and running, as stalling the execution pipelines causes severe performance penalties. In addition to the added complexity, these techniques also increase area and power consumption significantly. The clock network of a device can comprise a significant portion of the power budget. With heavy pipelining comes even larger and faster clock networks.

Practical architectures need not strictly adhere to the either the CISC or RISC approach, but may combine features of both. Some situations require backward compatibility to earlier processors in the product family, thus requiring CISC instruction support. This may be handled natively, or through emulation via the native instruction set of the underlying hardware.

Processor performance can be defined as the number of instructions consumed over a period of time. Decreasing the clock period (by increasing its frequency), and/or increasing parallelism (of execution) are common methods of improving performance.

Power consumption is becoming an increasingly important design metric. Just handling the distribution and dissipation of power can be a significant challenge for high performance chip designs. The increasing role of portable electronics that operate from a battery sometimes drives the application requirements. Other applications may be concerned with the maximum power density for an expansion slot in a chassis. For many applications, asynchronous approaches provide the necessary performance while conserving power.

When considering the fundamental problem of implementing a function in hardware, and whether or not to use a software approach with a processor, area, power consumption, and other tradeoffs must be considered.

Asynchronous logic has the following advantages:
 a) Low noise
 b) Reduced power
 c) Best possible versus worst-case speed
 d) Scaling over operating conditions (voltage, temperature, process)

Asynchronous logic has the following disadvantages:
 a) Design flow
 b) Design tools
 c) Testing Asynchronous logic does not have a global clock or timing reference. There are a number of methods of accomplishing this, ranging from inserting delays in signal lines, to providing completion signal outputs. Terminology commonly used to classify various asynchronous design approaches include:
 a) Self-timed—similar to synchronous, but with a locally generated clock
 b) Speed invariant—signals have handshakes between registers; a delay is inserted into the handshake signals based on the delay through the logic between registers.
 c) Delay-insensitive—unbounded delay for gates and interconnect requiring handshake One embodiment incorporates aspects of all three. For instructions or operations that do not involve input or output (such as communication with external logic or other processors), the processor is speed invariant since a delay is selected based on the lumped path delay for the type of operation or instruction selected. The speed invariant logic is used to generate a clock only for the desired destination registers, so it also contains aspects of a self-timed approach. When performing input or output operations, the processor is delay-insensitive since everything is on indefinite hold until the appropriate handshake is performed.

This embodiment provides a processor that is simple, fast, and power efficient, so that it may be used to replace blocks of conventional logic. The blocks of logic may be simple, or complex, depending on the algorithm and throughput requirements. Multiple instances of the processor may be connected together, or interspersed with conventional logic in a design.

As described in this embodiment, asynchronous operation and simplicity are the keys to performance. Some asynchronous designs use storage elements in a pipelined arrangement. In this invention, all pipelines are removed, and each instruction is completed in a single cycle. The entire processor is in a known, stable state at the end of each instruction. There are no side effects or hazards as a result of instruction order or sequence, and no latencies are introduced.

Instructions are grouped into either internal or external types. Internal instructions operate on data held within the processor and keep results there. External, or I/O instructions are ones where data is input or output from the processor. In keeping with asynchronous methodology, all external instructions must have a completion signal, defined by the chosen communication protocol. A simple request/acknowledge handshake protocol scheme, as shown in FIG. 1, has been incorporated in the preferred embodiment. A generic request (REQ), acknowledge (ACK), and data (DATA) waveform is shown on the left side of the figure. Input ports are provided in the processor for receiving input data (IDATA), an input request (IREQ) input signal, and for providing an input acknowledge (IACK) output signal. The directions are reversed for output ports in the processor, which provide an output request (OREQ) and output data (ODATA) signal outputs, and receive an output acknowledge (OACK) input signal.

An external device, another processor, or other logic wishing to provide input data would supply data on the IDATA port and assert the IREQ input signal. When the processor encounters the appropriate input instruction, the IACK signal would be asserted (provided that the IREQ signal is active). The system remains in this state until the IREQ signal is removed, at which point the IACK signal is also de-asserted and the next instruction is executed. It may be possible to have various input instructions. For example, one version may wait for valid input data as signified by the IREQ signal, while others may only sample the IREQ signal and move on if there is not valid input data.

Similarly, when the processor wishes to output data to an external device or other logic, it provides the data on the ODATA port while asserting the OREQ signal. The OACK input signal is then continuously sampled, and the processor stays in this state until the OACK signal is asserted. Once the OACK signal is asserted, the OREQ output signal is de-asserted, and the machine waits for the OACK signal to become inactive. Once that occurs, the machine continues on with the next instruction. Note that there may also be variations of output instructions that provide static values not requiring a handshake or similar protocol.

While the protocol illustrated in the preferred embodiment is simple and effective, other variations of input and output signaling are possible and acceptable as long as it is possible to determine completion.

Figure 2:
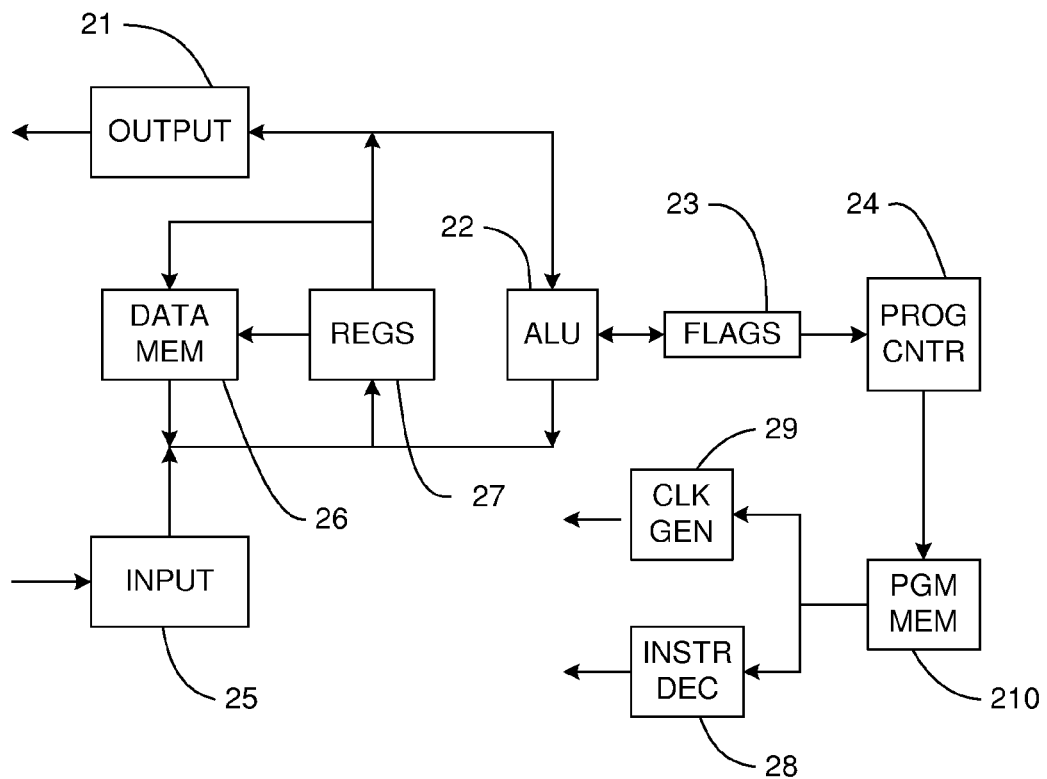
FIG. 2 is a block diagram of a processor according to one embodiment of the invention.

FIG. 2 is a block diagram of a processor according to one embodiment of the invention. While the processor shown in the figure and described below represents one embodiment, many variations are possible that still incorporate the novel aspects of this invention.

For simplicity, the processor is shown with only a single input port 25 and a single output port 21 that interface to external logic, devices, or additional processors. Any number of input or output ports may be easily accommodated with this architecture. The registers 27 hold input or output data, along with any intermediate results or other data. Any number of registers may be implemented in a given design. They may be discrete registers, or incorporated as a register file. An optional data memory 26 may be used to provide additional storage, and perhaps reduce the number of registers required. The output of the registers feed the arithmetic-logic unit (ALU) 22. Data in registers is fed into the ALU where it is processed, with the results going back to registers.

The results of many ALU operations have side effects or conditions that may be useful to subsequent instructions. Examples include the sign bit, the carry output from addition, or other similar notifications. These are stored in the FLAGS 23 module. A program counter PROG CNTR 24 represents the execution sequence of the machine by providing addresses to a program memory PGM MEM 210. The program memory in turn dispenses the instruction pointed to by the program counter. The FLAGS 23 may be optionally used to provide non-sequential program flow, as qualifiers for jumps, branches, or the like. An example would be "jump if not zero", where the zero flag is examined. Not explicitly shown are other optional paths that could provide data to the program counter for non-linear program execution, such as the use of signed or unsigned displacements interrupt traps, or other similar mechanisms. The program memory 210 may be fixed or programmable. A fixed program memory could be implemented as a ROM, PLA, or other similar structure. A programmable memory could be changed dynamically, or just at initialization time.

The instruction decoder INSTR DEC 28 decodes the instruction from the program memory 210 to provide control signals to other internal modules. The outputs from the instruction decoder are varied and include controls for data routing multiplexers, ALU operation codes, and the like. The clock generator CLK GEN 29 also receives a field from the instruction decoder to generate a clock pulse for the program counter and also to clock any specified destination registers. It should be noted that the clock generator in this embodiment does not generate a conventional clock signal, but instead generates pulses that may be needed by conventional synchronous registers that are incorporated into the design.

Figure 3:
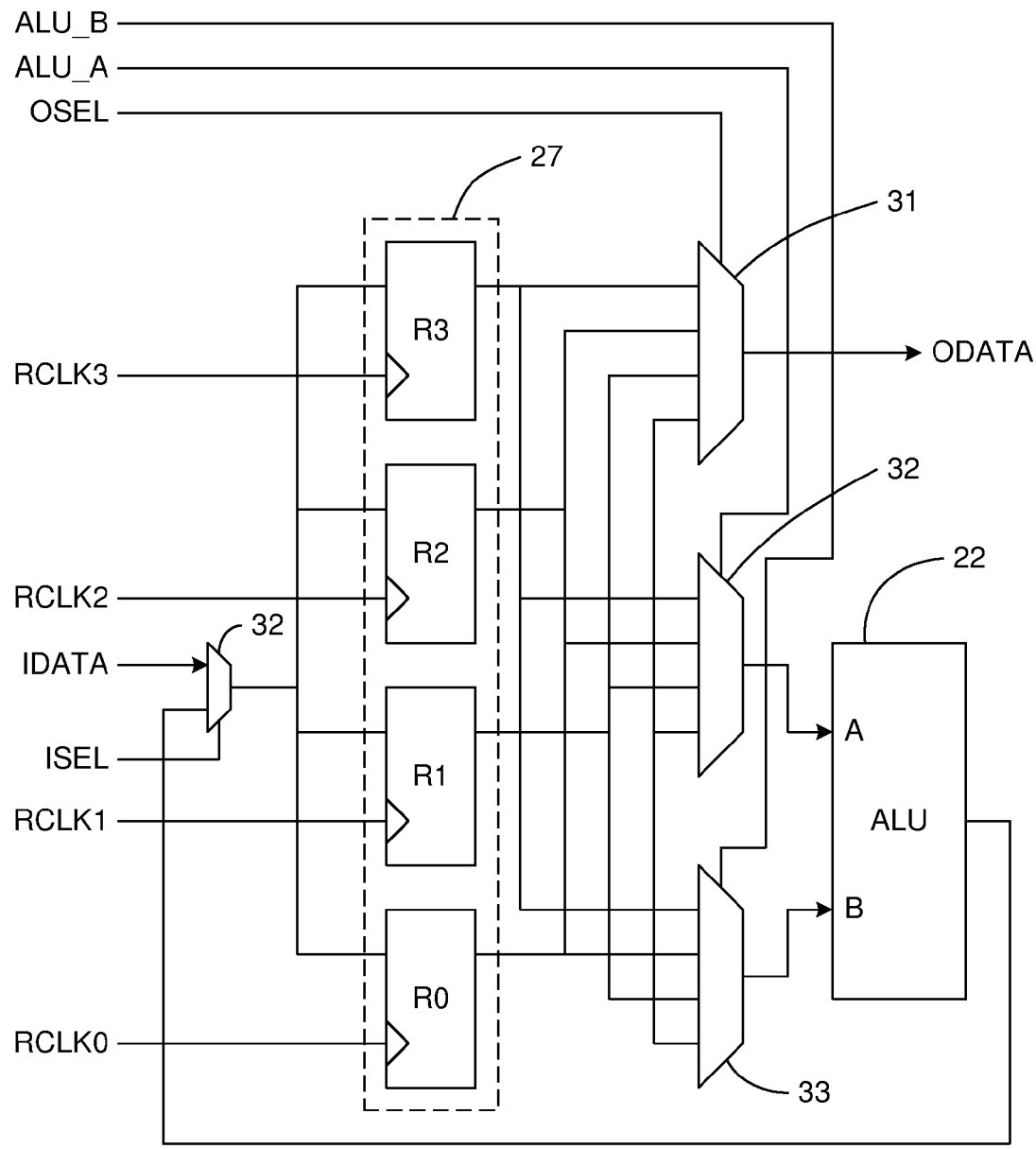
FIG. 3 is a block diagram showing more detailed view of the registers and the ALU of the processor in one embodiment.

FIG. 3 shows a more detailed view of the registers 27 and the ALU 22. In the design example shown, there are four registers, labeled R3 through R0. The registers contain a full word, which is a function of the particular processor implementation. Each register has a dedicated clock pulse signal, RCLK3 through RCLK0, which are derived from a common source in the clock generator module 29. At the end of the current instruction, only the clock signals for designated destination registers will be pulsed, producing a clock edge. Depending on the instruction, the source and destination registers could be identified implicitly, or by bit fields within the instruction. For example, a register-to-register move instruction could contain a 2-bit source and destination register field, where the two bits would be binary encoded to represent one of R0 through R3. The bit field used to determine the destination register would also be used to enable the appropriate register clock pulse. Alternatively, an instruction could use predefined registers. In FIG. 3, the registers are shown as having common input data—more complex arrangements are also possible. For example, full precision multiplication on two inputs of the same word size produces a result that is twice the word size. Therefore, a multiplication instruction could multiply R0 and R1, placing the result in R2 and R3 implicitly, with no need to explicitly name the source or destination registers. In this case, the result would straddle two registers, with R3 being the most significant, and R2 being the least significant. In other words, $$R3:R2=R0 \times R1$$

In this case, at the end of the multiply instruction, both RCLK2 and RCLK3 would produce edges.

The registers R3 through R0 have input data IDATA as well as the ALU output as possible sources. The ISEL signal, from instruction decoder 28, is used to select ALU data versus IDATA via multiplexer (mux) 32. IDATA would be selected for instructions that accept input data. Instructions that produced output data ODATA would select the source register by setting OSEL appropriately, which would then provide the correct output data via output multiplexer 31. The ALU has many varied paths from the two data inputs to the data output. The A input of the ALU is determined from multiplexer 32, which is controlled by the ALU_A signal. Similarly, the ALU B input is chosen by multiplexer 33, which is controller by the ALU_B input signal. The ALU_A and ALU_B signals are outputs from the instruction decoder 28. Perhaps the shortest path would be for simply moving data from one register to another, in which the input data of one port on the ALU would be reflected on the ALU output. Other paths involving operations of one or more inputs resulting in an output exist, with varying path lengths based on the complexity of the operations.

A key aspect of this embodiment involves timing the logic paths from the register outputs, through the ALU, to the register inputs for each of the possible instructions. Depending on the variance and clustering of the path delays, a number of bins are created for grouping instructions with similar delay values. The number of bins is arbitrary, as is the number of paths or instructions associated with each bin. Much of this is a function of the instruction set and the design of the ALU. The instruction decoder then identifies the bin with which an instruction is associated when the instruction is decoded. For the sake of discussion, three bins will be defined for the present embodiment: slow, medium, and fast. The variation between the bins is not necessarily, and in fact is unlikely to be, linear. For example, the register-to-register move operation previously mentioned would likely be categorized as fast, while the multiply would probably be slow. Input or output operations are not classified according to one of the bins. The completion timing of an input operation is based on the availability of data, coupled with completing the communication protocol. Similarly, the completion of an output operation is based on the receiving device or logic to accepting the output data, along with properly completing the protocol sequence.

Figure 4:
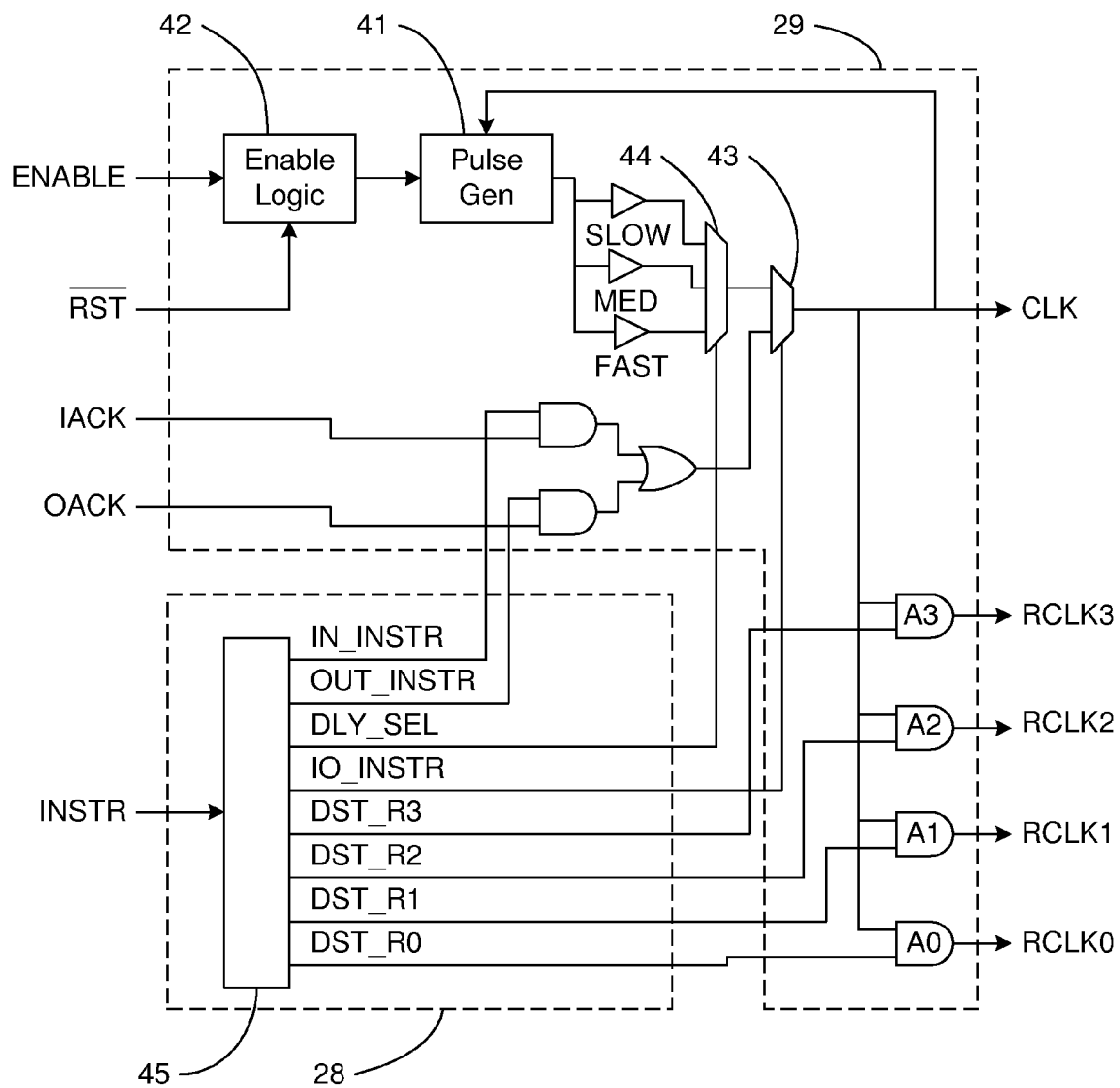
FIG. 4 is a block diagram showing a detailed view of the clock generator module of the processor in one embodiment.

FIG. 4 contains a detailed view of the clock generator module 29. RST and ENABLE are global control signals that were not shown on previous diagrams. RST is an asynchronous reset signal, and is provided to initialize the processor. ENABLE will allow the processor to begin operation when active, provided RST is not asserted. When the processor is starting up, the Enable Logic 42 supplies a priming edge to Pulse Generator 41, which generates a single pulse that is fed into a series of delay circuits labeled SLOW, MED, and FAST. The delay circuits consist of similar structures to the logic gates and paths themselves, and so their delay tracks the logic path delays over process, temperature, and operating conditions. One of the delay circuits is chosen based on the current instruction by signal DLY_SEL and the identification of the bin with which the instruction is associated.

The clock output CLK is active at the end of every instruction, and is used by the program counter PROG CNTR 24. All other registers have their own independent clock signals that are only enabled if the registers need to be updated. The clocks for registers R3 through R0 are shown as RCLK3 through RCLK0. The CLK output is fed back to Pulse Generator 41 to create additional pulses. The module group in the lower left of the figure is actually part of the instruction decoder INSTR DEC 28 module. The instruction is input to the instruction decoder, where it is decoded and drives much of the control logic in the processor. IN_INSTR is a signal that, when asserted, signifies that the current instruction is an input instruction. Similarly, OUT_INSTR signifies that the current instruction is an output instruction. The speed of the current instruction, (slow, medium, or fast) is signified by the delay select DLY_SEL signal, which is a binary encoded selector. IO_INSTR is really just the logical OR of IN_INSTR and OUT_INSTR, which is active when the current instruction is either an input or an output instruction. The communication protocol signals input acknowledge (IACK) and output acknowledge (OACK) are used if the instruction is an input or output instruction. The instruction decoder also supplies decodes for registers that need to be updated or are destinations of the current instruction. DST_R3, DST_R2, DST_R1, and DST_R0 each signify that R3, R2, R1 and R0, respectively, need updating. As can be seen in the figure, each is logically AND-ed with the clock by gates A3 through A0 to generate individual register clock signals for the registers.

Enable logic 42 is used to prime the clock generation sequence. The pulse generator 41 takes an input signal with a rising edge and shapes it so that the high period of the waveform has the proper width needed for proper operation. Normally, the output clock CLK is used to drive the pulse generator in a feedback arrangement. During the initialization sequence, before the first instruction has been executed, the enable logic provides this function.

The multiplexer 43 is used to select the event that terminates the current instruction cycle: either the handshake for an I/O operation, or a delayed clock pulse for an internal operation. For internal operations, the DLY_SEL signals are used to control multiplexer 44 to select one of the timing delays, which are slow, medium, and fast in this case. The actual delays are based on the worst-case timing path for instructions in that bin or timing range, and are generated by passing pulses generated by pulse generator 41 through circuitry that delays the pulses by different amounts.

Those of skill in the art will understand that information and signals may be represented using any of a variety of different technologies and techniques. For example, data, instructions, commands, information, signals, bits, symbols, and the like that may be referenced throughout the above description may be represented by voltages, currents, electromagnetic waves, magnetic fields or particles, optical fields or particles, or any combination thereof. The information and signals may be communicated between components of the disclosed systems using any suitable transport media, including wires, metallic traces, vias, optical fibers, and the like.

Those of skill will further appreciate that the various illustrative logical blocks, modules, circuits, and algorithm steps described in connection with the embodiments disclosed herein may be implemented in various ways. To clearly illustrate this variability of the system's topology, the illustrative components, blocks, modules, circuits, and steps have been described above generally in terms of their functionality. Whether such functionality is implemented in the particular functional blocks specifically described above depends upon the particular application and design constraints imposed on the overall system and corresponding design choices. Those of skill in the art may implement the described functionality in varying ways for each particular application, but such implementation decisions should not be interpreted as causing a departure from the scope of the present invention.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A device comprising:
   a self-timed processor;
   a plurality of delay circuits;
   wherein the processor is configured to, for each of a plurality of program instructions,
      receive the instruction,
      decode the instruction,
      select one of the delay circuits based upon an operation code ("op-code") of the decoded instruction
      execute the instruction asynchronously with respect to global timing signals and in an amount of time required for a timing signal to traverse the selected one of the delay circuits;
   wherein, for each of the plurality of delay circuits, a speed at which the timing signal propagates through the delay circuit varies to match operating-condition-based variations in a speed at which signals propagate through the processor, wherein the operating-condition-based variations are selected from the group consisting of temperature-based variations, manufacturing-process-based variations and voltage-based variations.

2. The device of claim 1, wherein execution of each instruction is controlled by timing signals that are internally generated by the processor independent of clock signals external to the processor.

3. The device of claim 2, wherein execution of each instruction is terminated by an end-of-execution pulse associated with the instruction.

4. The device of claim 3, wherein execution of each instruction is initiated by an end-of-execution pulse associated with a previous instruction.

5. The device of claim 4, wherein the processor is configured to generate the end-of-execution pulse associated with the instruction by delaying the end-of-execution pulse associated with the previous instruction by the amount of time for execution of the instruction.

6. The device of claim 5, wherein the processor is configured to delay the end-of-execution pulse associated with the previous instruction by routing the end-of-execution pulse associated with the previous instruction through a selected one of a plurality of delay circuits having different delays.

7. The device of claim 6, further comprising enable circuitry and pulse generator circuitry, wherein the enable circuitry is configured to generate a priming edge signal at startup and to provide the priming edge signal to the pulse generator circuitry, and wherein the pulse generator circuitry is configured to route the priming edge through a selected one of the delay circuits to generate an end-of-execution pulse associated with a first instruction.

8. The device of claim 1, wherein the instructions include an input/output (I/O) instruction type having an I/O op-code, wherein the processor is configured to execute each instruction having the I/O op-code in an amount of time that is based on completion of a handshake procedure.

9. The device of claim 1, wherein the processor is configured to operate alternately in either a first mode in which each instruction is executed in a predetermined amount of time that is selected based on the op-code of the instruction, or in a second mode in which each instruction is executed in an amount of time that is dependent upon execution of a handshake procedure.

10. The device of claim 1, wherein the processor is configured to:
   when the instruction is a non-I/O instruction, operate in a first mode in which the instruction is executed in a predetermined amount of time that is selected based on the op-code of the instruction, and
   when the instruction is an I/O instruction, operate in a second mode in which each instruction is executed in an amount of time that is dependent upon execution of a handshake procedure.

11. A device comprising:
   a processor;
   wherein the processor is configured to operate asynchronously with respect to global timing signals;
   wherein the processor is configured to
      receive a plurality of program instructions,
      decode the instructions,
      select delay circuits corresponding to each of the instructions based upon operation codes ("op-codes") of the decoded instructions,
      generate internal timing signals for execution of each of the instructions by routing timing signals through the corresponding delay circuits, and
      execute the instructions in corresponding amounts of time required for the timing signals to traverse the corresponding delay circuits, wherein the amount of time required to traverse each of the delay circuits varies to match operating-condition-based variations in a time required for the processor to process the corresponding instructions, wherein the operating-condition-based variations are selected from the group consisting of temperature-based variations, manufacturing-process-based variations and voltage-based variations.

12. A method implemented in a processor comprising:
   receiving a series of program instructions;
   for each instruction,
      decoding the instruction
      determining an operation code ("op-code") of the instruction
      selecting one of a plurality of delay circuits based upon the op-code executing the instruction asynchronously with respect to global timing signals and in an amount of time required for a timing signal to traverse the selected one of the delay circuits, wherein the amount of time required to traverse each of the delay circuits varies to match operating-condition-based variations in a time required for the processor to process the corresponding instructions, wherein the operating-condition-based variations are selected from the group consisting of temperature-based variations, manufacturing-process-based variations and voltage-based variations.

13. The method of claim 12, further comprising internally generating timing signals independent of clock signals external to the processor and thereby controlling execution of the instructions.

14. The method of claim 13, further comprising terminating execution of each instruction with an end-of-execution pulse associated with the instruction.

15. The method of claim 14, further comprising initiating execution of each instruction with an end-of-execution pulse associated with a previous instruction.

16. The method of claim 15, wherein generating the end-of-execution pulse associated with the instruction comprises delaying the end-of-execution pulse associated with the previous instruction by the amount of time for execution of the instruction.

17. The method of claim 16, wherein delaying the end-of-execution pulse associated with the previous instruction comprises routing the end-of-execution pulse associated with the previous instruction through a selected on of a plurality of delay circuits having different delays.

18. The method of claim 17, further comprising generating a priming edge signal at startup and generating an end-of-execution pulse associated with a first instruction based by routing the priming edge through a selected one of the delay circuits.

19. The method of claim 12, further comprising:
when the instruction is a non-I/O instruction, operating in a first mode in which the instruction is executed in a predetermined amount of time that is selected based on the op-code of the instruction; and
when the instruction is an I/O instruction, operating in a second mode in which each instruction is executed in an amount of time that is dependent upon execution of a handshake procedure.

20. The device of claim 7, wherein the processor is configured to:
when the instruction is a non-I/O instruction, operate in a first mode in which the instruction is executed in a predetermined amount of time that is selected based on the op-code of the instruction, and
when the instruction is an I/O instruction, operate in a second mode in which each instruction is executed in an amount of time that is dependent upon execution of a handshake procedure.

* * * * *